(12) United States Patent
Tsuchiya et al.

(10) Patent No.: US 11,922,680 B2
(45) Date of Patent: Mar. 5, 2024

(54) IMAGE DETERMINATION DEVICE, IMAGE DETERMINATION METHOD, AND NON-TRANSITORY COMPUTER READABLE MEDIUM STORING PROGRAM

(71) Applicant: OMRON Corporation, Kyoto (JP)

(72) Inventors: Naoki Tsuchiya, Otsu (JP); Yoshihisa Ijiri, Tokyo (JP); Yu Maruyama, Tokyo (JP); Yohei Okawa, Koshigaya (JP); Kennosuke Hayashi, Tokyo (JP); Sakon Yamamoto, Tokyo (JP)

(73) Assignee: OMRON Corporation, Kyoto (JP)

( * ) Notice: Subject to any disclaimer, the term of this patent is extended or adjusted under 35 U.S.C. 154(b) by 460 days.

(21) Appl. No.: 17/270,450

(22) PCT Filed: Nov. 14, 2019

(86) PCT No.: PCT/JP2019/044738
§ 371 (c)(1),
(2) Date: Feb. 23, 2021

(87) PCT Pub. No.: WO2020/137228
PCT Pub. Date: Jul. 2, 2020

(65) Prior Publication Data
US 2021/0256302 A1 Aug. 19, 2021

(30) Foreign Application Priority Data
Dec. 27, 2018 (JP) ................. 2018-245674

(51) Int. Cl.
*G06V 10/44* (2022.01)
*G06F 18/211* (2023.01)
(Continued)

(52) U.S. Cl.
CPC .......... *G06V 10/809* (2022.01); *G06F 18/211* (2023.01); *G06F 18/214* (2023.01);
(Continued)

(58) Field of Classification Search
CPC .... G06V 10/803; G06V 10/809; G06V 10/44; G06V 10/774
See application file for complete search history.

(56) References Cited

U.S. PATENT DOCUMENTS

2015/0170004 A1   6/2015  Song et al.
2017/0302867 A1  10/2017  Ichikawa et al.

FOREIGN PATENT DOCUMENTS

CN    107113383    8/2017
JP    H0484282     3/1992
(Continued)

OTHER PUBLICATIONS

"International Search Report (Form PCT/ISA/210) of PCT/JP2019/044738," dated Jan. 21, 2020, with English translation thereof, pp. 1-2.
(Continued)

*Primary Examiner* — Sam Bhattacharya
(74) *Attorney, Agent, or Firm* — JCIPRNET (57) ABSTRACT

An image determination device includes feature extractors which output, on the basis of an image to be examined, each piece of feature data indicating a specific feature of the image; a first training part which trains a first determiner so as to output first output data indicating first label data associated with a first training image on the basis of first feature data output when the first training image is input to the feature extractors; a second training part which trains a second determiner so as to output second output data indicating second label data associated with a second training image on the basis of second feature data output when the second training image is input to the feature extractors; and an output part which outputs, on the basis of the first output data and the second output data, output data indicating an overall determination result about an image.

6 Claims, 8 Drawing Sheets

(51) Int. Cl.
*G06F 18/214* (2023.01)
*G06F 18/2413* (2023.01)
*G06V 10/774* (2022.01)
*G06V 10/776* (2022.01)
*G06V 10/80* (2022.01)

(52) U.S. Cl.
CPC .......... *G06F 18/2413* (2023.01); *G06V 10/44* (2022.01); *G06V 10/774* (2022.01); *G06V 10/776* (2022.01); *G06V 10/803* (2022.01)

(56) References Cited

FOREIGN PATENT DOCUMENTS

| JP | H05181972 | 7/1993 |
|----|-----------|--------|
| JP | 2005034211 | 2/2005 |
| JP | 2006039862 | 2/2006 |
| JP | 2009301121 | 12/2009 |
| JP | 2017049974 | 3/2017 |

OTHER PUBLICATIONS

"Written Opinion of the International Searching Authority (Form PCT/ISA/237) of PCT/JP2019/044738," dated Jan. 21, 2020, with English translation thereof, pp. 1-7.

Lien Po Chun et al., "Product Surface Defect Detection Based on Deep Learning," 2018 IEEE 16th Intl Conf on Dependable, Autonomic and Secure Computing, Aug. 2018, pp. 250-255.

Shiqing Ma et al., "MODE: automated neural network model debugging via state differential analysis and input selection," Proceedings of the 2018 26th ACM Joint Meeting on European Software Engineering Conference and Symposium on the Foundations of Software Engineering, Oct. 2018, pp. 175-186.

"Search Report of Europe Counterpart Application", dated Aug. 1, 2022, p. 1-p. 7.

Office Action of China Counterpart Application, with English translation thereof, dated Dec. 15, 2023, pp. 1-20.

IMAGE DETERMINATION DEVICE, IMAGE DETERMINATION METHOD, AND NON-TRANSITORY COMPUTER READABLE MEDIUM STORING PROGRAM

CROSS-REFERENCE TO RELATED APPLICATION

This application is a 371 application of the International PCT application serial no. PCT/JP2019/044738, filed on Nov. 14, 2019, which claims the priority benefits of Japan Patent Application No. 2018-245674, filed on Dec. 27, 2018. The entirety of each of the above-mentioned patent applications is hereby incorporated by reference herein and made a part of this specification.

TECHNICAL FIELD

The present invention relates to an image determination device, an image determination method, and a non-transitory computer readable medium storing an image determination program.

BACKGROUND ART

In the related art, automatic control using image processing has been widely put into practical use in the field of factory automation (FA). For example, a step of capturing an image of an examination target such as a work piece and examining the quality of the work piece on the basis of a feature amount extracted from the captured image is realized.

For example, Patent Literature 1 discloses a device that determines whether or not there is a defect, which is an examination target, on the basis of an output result of an identification device that trains using an image to be examined and captured under a plurality of imaging conditions for training data. Specifically, the device disclosed in Patent Literature 1 includes a training extraction means, a selection means, and a generation means. The training extraction means is extracts a feature amount of each of at least two images based on images captured under at least two different imaging conditions with respect to an object whose exterior quality is known. The selection means selects a feature amount for determining the quality of an object from the feature amount spanning the feature amounts extracted from the at least two images by the training extraction means. The generation means generates an identification device for determining the quality of an object on the basis of the feature amount selected by the selection means.

CITATION LIST

Patent Literature

[Patent Literature 1]
  Japanese Patent Laid-Open No. 2017-49974

SUMMARY

Technical Problem

In a case where determination regarding the presence or absence of a defect, the type of work piece, or the like is performed on an image to be examined using a training model, additional training of the training model may be performed using a newly acquired image or an image on which erroneous determination is performed due to a training model. However, when any parameter of the training model is updated through additional training, it may become unclear to what part of the training model a change has been made through the additional training, and it may not be possible to explain what kind of change of the training model has resulted in a change in a determination result.

Consequently, the present invention provides an image determination device, an image determination method, and a non-transitory computer readable medium storing an image determination program for clarifying what kind of change of a training model has resulted in a change in a determination result even when additional training of the training model is performed.

Solution to Problem

An image determination device according to an aspect of the present includes one or a plurality of feature extractors each of which outputs feature data indicating a specific feature of an image to be examined on the basis of the image, a first determiner which outputs first output data indicating a determination result related to the image on the basis of the feature data output from the one or plurality of feature extractors, a second determiner which outputs second output data indicating a determination result related to the image on the basis of the feature data output from the one or plurality of feature extractors, a first training part which causes the first determiner to train so as to output the first output data indicating first label data associated with a first training image, on the basis of first feature data which is output in a case where the first training image is input to the one or plurality of feature extractors using training data including the first training image and the first label data, a second training part which causes the second determiner to train so as to output second output data indicating second label data associated with a second training image, on the basis of second feature data which is output in a case where the second training image is input to the one or plurality of feature extractors in a case where new training data including the second training image and the second label data is added, and an output part which outputs output data indicating an integrated determination result related to the image, on the basis of the first output data and the second output data, wherein the first output data is output by the first determiner on the basis of the feature data output in a case where the image is input to the one or plurality of feature extractors, and the second output data is output by the second determiner on the basis of the feature data output in a case where the image is input to the one or plurality of feature extractors.

According to the aspect, the second determiner is newly generated and added through additional training, and determinations performed by the first determiner and the second determiner are combined with each other, whereby it becomes clear what kind of change of a training model has resulted in a change in a determination result even when additional training of the training model is performed.

In the above-described aspect, the output part may change relative weightings of the first output data and the second output data in accordance with a degree of similarity between the feature data and the second feature data.

According to the aspect, it is possible to determine whether an input image is similar to the second training image according to the degree of similarity between the feature data and the second feature data, and it is possible to change which one of a determination result obtained by the first determiner trained using the first training image and a determination result obtained by the second determiner trained using the second training image is regarded as important.

In the above-described aspect, the output part may increase the relative weighting of the second output data as a distance between the feature data and the second feature data in a feature space decreases.

According to the aspect, it is possible to determine whether or not an input image is similar to the second training image according to a distance between the feature data and the second feature data, and it is possible to attach more importance to a determination result obtained by the second determiner trained using the second training image as the distance decreases.

In the above-described aspect, the image determination device may further include an identification device which identifies to which one of the first feature data and the second feature data the feature data is similar, in which the output part may change relative weightings of the first output data and the second output data on the basis of an identification result obtained by the identification device.

According to the aspect, it is possible to determine to which one of a first training image and a second training image an input image is similar by identifying to which one of the first feature data and the second feature data to feature data is similar by an identification device, and it is possible to change which one of a determination result obtained by the first determiner trained using the first training image and a determination result obtained by the second determiner trained using the second training image is regarded as important.

An image determination method according to another aspect of the present invention includes causing a first determiner to train so as to output first output data indicating first label data associated with a first training image, on the basis of first feature data which is output in a case where the first training image is input to one or a plurality of feature extractors using training data including the first training image and the first label data, the first determiner outputting the first output data indicating a determination result related to an image to be examined on the basis of feature data which is output from the one or plurality of feature extractors that output the feature data indicating a specific feature of the image on the basis of the image, causing a second determiner to train so as to output second output data indicating second label data associated with a second training image, on the basis of second feature data which is output in a case where the second training image is input to the one or plurality of feature extractors, the second determiner outputting the second output data indicating a determination result related to the image on the basis of the feature data output from the one or plurality of feature extractors in a case where new training data including the second training image and the second label data is added, and outputting output data indicating an integrated determination result related to the image, on the basis of the first output data and the second output data, wherein the first output data is output by the first determiner on the basis of the feature data output in a case where the image is input to the one or plurality of feature extractors, and the second output data is output by the second determiner on the basis of the feature data output in a case where the image is input to the one or plurality of feature extractors.

According to the aspect, the second determiner is newly generated and added through additional training, and determinations performed by the first determiner and the second determiner are combined with each other, whereby it becomes clear what kind of change of a training model has resulted in a change in a determination result even when additional training of the training model is performed.

A non-transitory computer readable medium storing an image determination program according to still another aspect causes a computation part included in an image determination device to function as one or a plurality of feature extractors each of which outputs feature data indicating a specific feature of an image to be examined on the basis of the image, a first determiner which outputs first output data indicating a determination result related to the image on the basis of the feature data output from the one or plurality of feature extractors, a second determiner which outputs second output data indicating a determination result related to the image on the basis of the feature data output from the one or plurality of feature extractors, a first training part which causes the first determiner to train so as to output the first output data indicating first label data associated with a first training image, on the basis of first feature data which is output in a case where the first training image is input to the one or plurality of feature extractors using training data including the first training image and the first label data, a second training part which causes the second determiner to train so as to output second output data indicating second label data associated with a second training image, on the basis of second feature data which is output in a case where the second training image is input to the one or plurality of feature extractors in a case where new training data including the second training image and the second label data is added, and an output part which outputs output data indicating an integrated determination result related to the image, on the basis of the first output data and the second output data, wherein the first output data is output by the first determiner on the basis of the feature data output in a case where the image is input to the one or plurality of feature extractors, and the second output data is output by the second determiner on the basis of the feature data output in a case where the image is input to the one or plurality of feature extractors.

According to the aspect, the second determiner is newly generated and added through additional training, and determinations performed by the first determiner and the second determiner are combined with each other, whereby it becomes clear what kind of change of a training model has resulted in a change in a determination result even when additional training of the training model is performed.

Advantageous Effects of Invention

According to the present invention, it is possible to provide an image determination device, an image determination method, and a non-transitory computer readable medium storing an image determination program for clarifying what kind of change of a training model has resulted in a change in a determination result even when additional training of the training model is performed.

DESCRIPTION OF THE EMBODIMENTS

Hereinafter, an embodiment according to an aspect of the present invention (hereinafter, also referred to as "the present embodiment") will be described with reference to the accompanying drawings. However, the embodiment to be described below is merely an example of the present invention in all respects. It is needless to say that various improvements and modifications can be made without departing from the scope of the present invention. That is, a specific configuration according to the embodiment may be appropriately adopted when implementing the present invention. Meanwhile, data appearing in the present embodiment is described in natural language, but more specifically designated in a pseudo language, commands, parameters, machine language, or the like that can be recognized by a computer.

§ 1 Application Example

Figure 1:
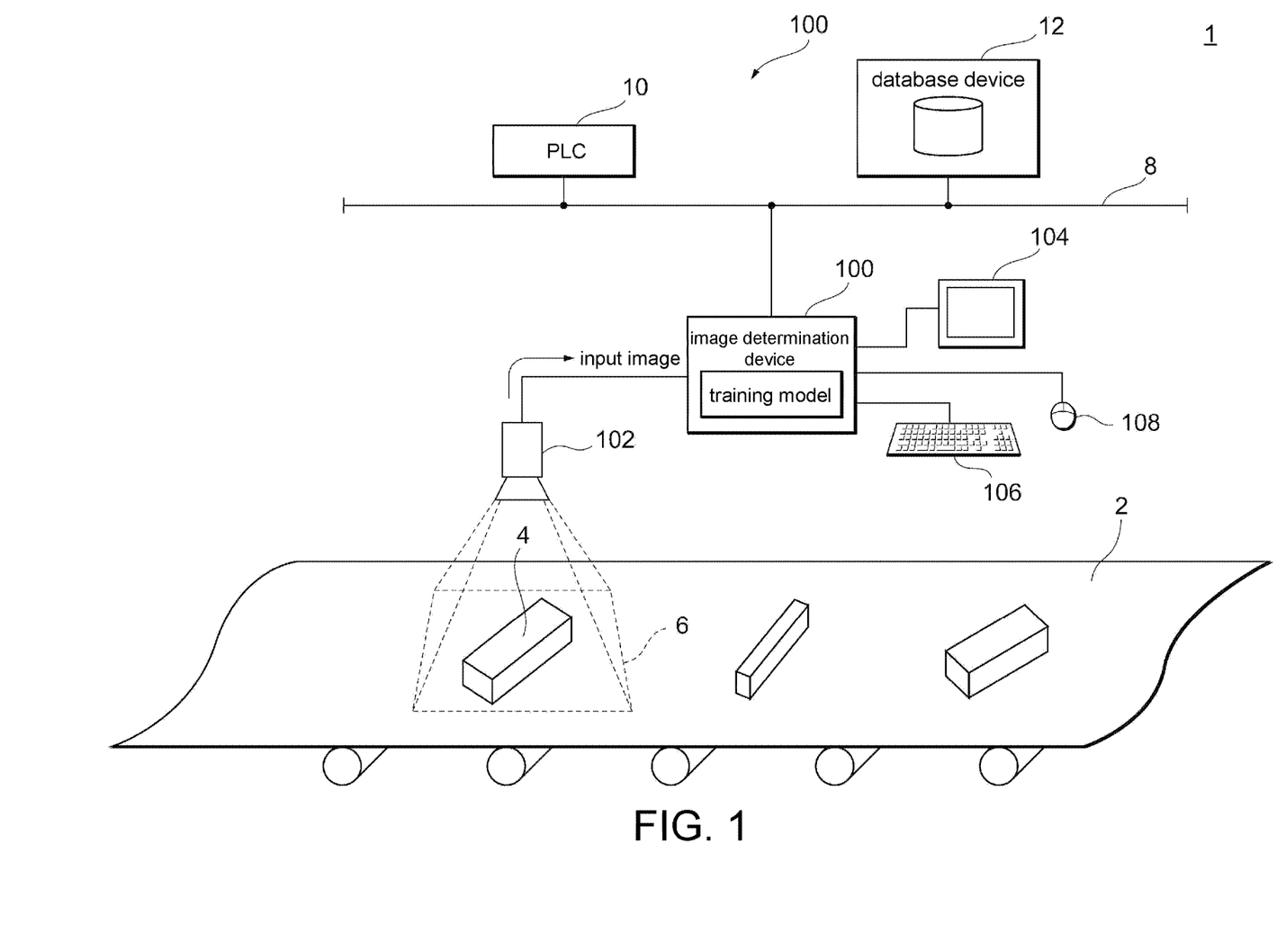
FIG. 1 is a diagram illustrating a configuration example of an image determination system according to an embodiment of the present invention.

FIG. 1 is a diagram illustrating a configuration example of an image determination system 1 according to an embodiment of the present invention. First, an example of a situation to which the present invention is applied will be described. The image determination system 1 according to the present embodiment analyzes an input image generated by capturing an image of an examination target using a training model included in an image determination device 100 and performs examination of a defect and classification of the target. The training model may be trained in advance so as to classify the presence or absence of a defect with respect to an examination target and the type of examination target by using training data. In addition, the training model may be additionally trained in a case where new training data is obtained. The image determination system 1 according to the present embodiment updates a training model so that it becomes clear what kind of change of the training model has resulted in a change in a determination result in a case where a training model is additionally trained. Meanwhile, an examination target includes, for example, work pieces such as parts and products in a manufacturing process.

As illustrated in FIG. 1, for example, the image determination system 1 realizes exterior examination or exterior measurement of a work piece 4 which is an examination target conveyed on a belt conveyor 2 by performing image measurement processing on an input image obtained by capturing the work piece 4. In the following description, an example applied to examination of the presence or absence of a defect on the surface of the work piece 4, and the like will be described as a typical example of image measurement processing. However, the present invention is not limited thereto, and the example can also be applied to specification of the type of defect, dimensional measurement of an exterior shape of a defect, specification of the type of work piece 4, and the like.

A camera 102 which is an imaging part is disposed above the belt conveyor 2, and an imaging visual field 6 of the camera 102 is configured to include a predetermined region of the belt conveyor 2. Image data (hereinafter, also referred to as an "input image") generated by the imaging of the camera 102 is transmitted to the image determination device 100. The imaging of the camera 102 is executed periodically or when an event occurs.

The image determination device 100 is connected to a programmable controller (PLC) 10, a database device 12, and the like through a high-order network 8. A measurement result in the image determination device 100 may be transmitted to the PLC 10 and/or the database device 12. Meanwhile, any device may be connected to the high-order network 8, in addition to the PLC 10 and the database device 12.

A display 104 for displaying a state during processing, measurement results, and the like, and a keyboard 106 and a mouse 108 serving as input parts receiving a user's operation may be connected to the image determination device 100.

The image determination device 100 includes a training model generated through machine training. The training model includes one or a plurality of feature extractors, a first determiner, and a second determiner. The one or plurality of feature extractors receive an image as an input and output feature data indicating a specific feature of the image. The first determiner outputs first output data indicating a determination result related to the image on the basis of feature data output from the one or plurality of feature extractors. The second determiner outputs second output data indicating a determination result related to the image on the basis of feature data output from the one or plurality of feature extractors. Here, the one or plurality of feature extractors may include, for example, an edge extractor that extracts an edge included in the image, a planar part extractor that extracts a planar region included in the image, a background pattern extractor that extracts a background pattern of the image, a binarization region extractor that extracts a binarization region included in the image, and the like. The one or plurality of feature extractors may be a model for extracting a single feature that is easy for individual persons to understand, may be a machine training model, or may be a rule-based model. The first determiner and the second determiner receive one or a plurality of pieces of feature data as inputs and output output data indicating a determination result regarding an image. The output data may be data indicating, for example, the presence or absence of a defect which is an examination target, the type of defect, dimensions of an exterior shape of a defect, the type of examination target, and the like. The first determiner and the second determiner may be constituted by, for example, a neural network.

Examination conditions such as the type of work piece 4 flowing on a production line and imaging conditions vary depending on a production line and do not necessarily match conditions at the time of training. For this reason, when a preliminarily trained training model is used for a production line, erroneous determination results may be output. Consequently, a training model may be additionally trained by collecting images that cannot be correctly determined by the training model. At this time, when the training model is updated without any restrictions, it becomes unclear whether or not determination is performed by paying attention to the initially assumed features, and thus it becomes unclear to what part of the training model a change has been made through additional training, and it may not be possible to explain what kind of change of the training model has resulted in a change in a determination result. For this reason, in a case where a training model is introduced into a production line, it becomes difficult to explain the reliability of the training model, which may result in interference with the introduction.

In view of such circumstances, the image determination device 100 according to the present embodiment generates the first determiner through preliminary training, generates the second determiner through additional training, and does not change the one or plurality of feature extractors included in the training model, so that it is clarified to what part of the training model a change has been made through the additional training. In the additional training, the second determiner is trained by fixing the configurations of the one or plurality of feature extractors. Then, the image determination device 100 integrates outputs of the first determiner and the second determiner, and outputs an integrated determination result. In this manner, the second determiner is newly generated and added through additional training, and thus it becomes clear what kind of change of the training model has resulted in a change in a determination result even when additional training of the training model is performed. Thereby, in a case where a training model is introduced into a production line, it becomes easy to explain the reliability of the training model, and thus it is possible to prevent the introduction from being disturbed. Meanwhile, the image determination device 100 may add a new determiner whenever new training data is added. Then, the image determination device 100 may integrate outputs of a plurality of determiners and output an integrated determination result.

§ 2 Configuration Example

[Hardware Configuration]

Figure 2:
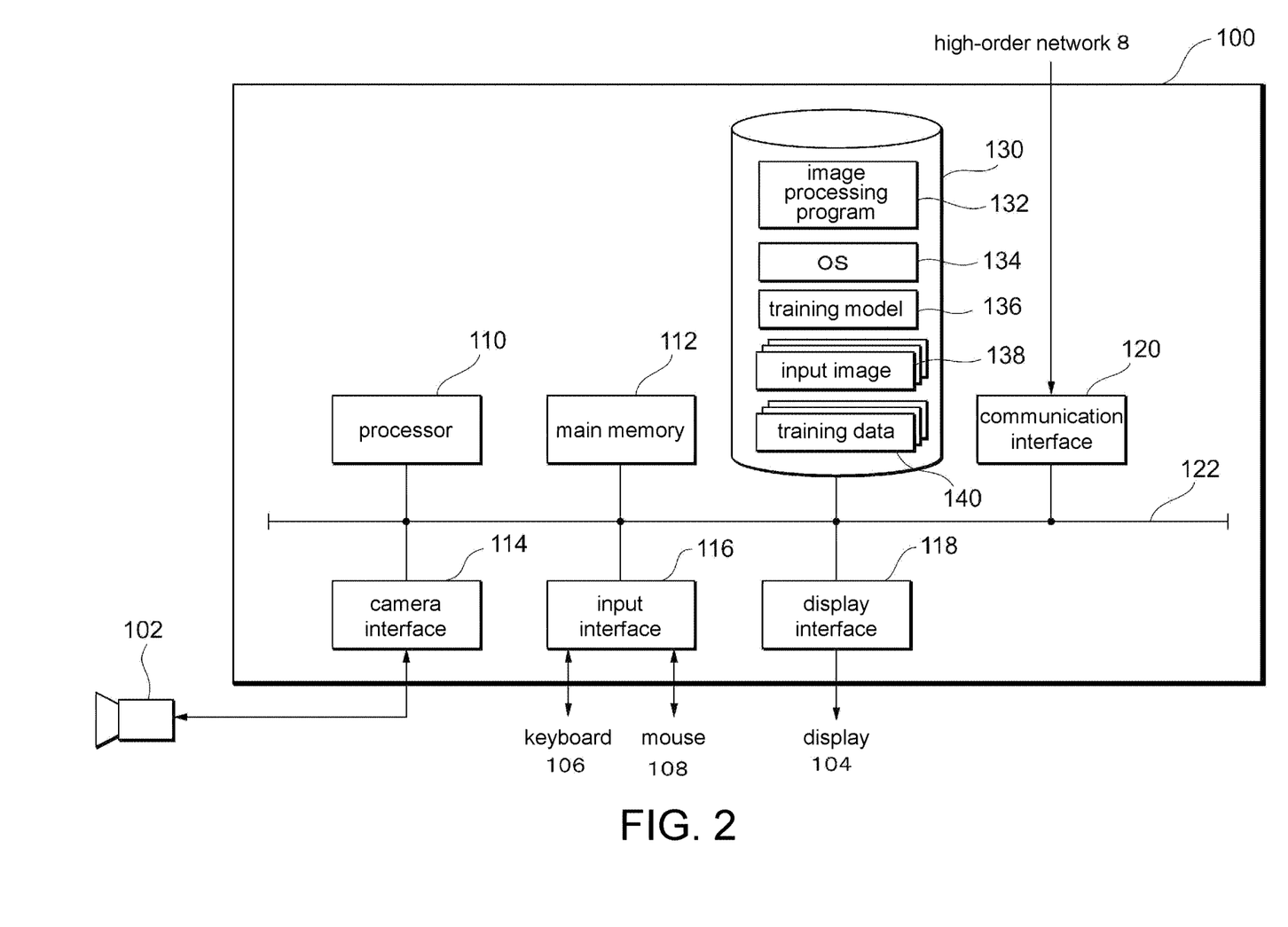
FIG. 2 is a diagram illustrating a hardware configuration of an image determination device according to the present embodiment.

FIG. 2 is a diagram illustrating a hardware configuration of the image determination device 100 according to the present embodiment. The image determination device 100 may be realized using a general-purpose computer configured in accordance with general-purpose computer architecture as an example. The image determination device 100 includes a processor 110, a main memory (main storage part) 112, a camera interface 114, an input interface 116, a display interface 118, a communication interface 120, and a storage (auxiliary storage part) 130. Typically, these components are communicatively connected to each other through an internal bus 122.

The processor 110 realizes functions and processes as described in detail using the next drawing and the subsequent drawings by loading programs stored in the storage 130 in the main memory 112 and executing the programs. The main memory 112 is constituted by a volatile memory and functions as a work piece memory required to execute a program by the processor 110.

The camera interface is an example of an acquisition part. The camera interface 114 is connected to the camera 102 to acquire an input image captured by the camera 102. The camera interface 114 may give an instruction for an imaging timing or the like to the camera 102.

The input interface 116 is connected to input parts on which a user's operation is performed, such as the keyboard 106 and the mouse 108. The input interface 116 acquires a command indicating an operation performed on the input part by the user, or the like.

The display interface 118 is connected to the display 104 serving as a display part. The display interface 118 outputs various processing results generated by executing programs by the processor 110 to the display 104.

The communication interface 120 takes charge of processing for communicating with the PLC 10, the database device 12, and the like through the high-order network 8.

The storage 130 stores programs for causing a computer to function as the image determination device 100, such as an image processing program 132 and an operating system (OS) 134 for realizing a training model 136. The storage 130 may further store a training model 136, an input image 138 acquired from the camera 102, and training data 140 which is used to train the training model 136. Meanwhile, the training data 140 may be acquired from external equipment such as the database device 12 through the high-order network 8 or may be temporarily stored in the storage 130.

The image processing program 132 stored in the storage 130 may be installed in the image determination device 100 through an optical recording medium such as a digital versatile disc (DVD), a semiconductor recording medium such as a universal serial bus (USB) memory, or the like. Alternatively, the image processing program 132 may be downloaded from a server device or the like on a network.

The image processing program 132 according to the present embodiment does not include all software modules for realizing functions according to the present embodiment, and may cause necessary functions to be provided in cooperation with the OS 134.

The image processing program 132 according to the present embodiment may be provided by being incorporated into a portion of another program. Also in this case, the image processing program 132 itself does not include a module included in the other program to be combined as described above, and processing is executed in cooperation with the other program. In this manner, the image processing program 132 according to the present embodiment may be configured to be incorporated into another program.

FIG. 2 illustrates an example in which the image determination device 100 is realized using a general-purpose computer. However, the present invention is not limited thereto, and all or some of the functions thereof may be realized using a dedicated circuit (for example, an application specific integrated circuit (ASIC), a field-programmable gate array (FPGA), or the like). Further, an external device connected through a network may take charge of some processes.

[Functional Configuration]

Figure 3:
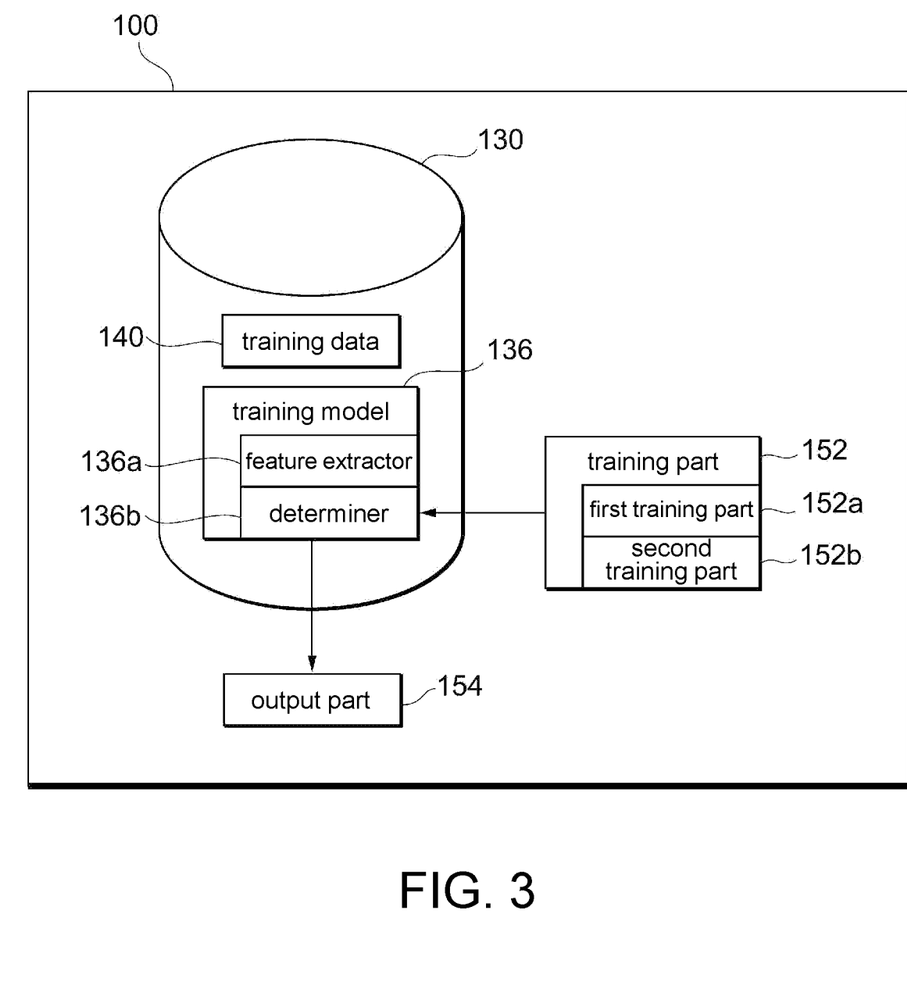
FIG. 3 is a diagram illustrating functional blocks of the image determination device according to the present embodiment.

FIG. 3 is a diagram illustrating functional blocks of the image determination device 100 according to the present embodiment. The image determination device 100 includes the training model 136 stored in the storage 130, a training part 152, and an output part 154

The training model 136 includes one or plurality of feature extractors 136a and a determiner 136b. The one or plurality of feature extractors 136a each outputs feature data indicating a specific feature of an image to be examined on the basis of the image. The determiner 136b outputs output data indicating a determination result regarding the image on the basis of the feature data output from the one or plurality of feature extractors 136a.

The determiner 136b includes a plurality of determiners trained with different training data. In the present embodiment, the determiner 136b includes a first determiner 136b-1 and a second determiner 136*b*-2. The first determiner 136*b*-1 outputs first output data indicating a determination result related to an image on the basis of feature data output from the one or plurality of feature extractors 136*a*. The second determiner 136*b*-2 outputs second output data indicating a determination result related to an image on the basis of feature data output from the one or plurality of feature extractors 136*a*. Meanwhile, the determiner 136*b* may include three or more determiners.

The training part 152 includes a first training part 152*a* and a second training part 152*b*. The first training part 152*a* causes the first determiner 136*b*-1 to train so as to output first output data indicating first label data associated with a first training image, on the basis of first feature data output in a case where the first training image is input to the one or plurality of feature extractors 136*a* using the training data 140 including the first training image and the first label data. Here, the first training image is a previously captured image to be examined. In addition, the first label data is data indicating the state of the image to be examined, and may be data indicating, for example, the presence or absence of a defect related to an examination target, the type of defect, dimensions of the exterior shape of a defect, the type of examination target, and the like. training processing of the first determiner 136*b*-1 may be executed before the image determination device 100 is incorporated into a production line.

The second training part 152*b* causes the second determiner 136*b*-2 to train so as to output second output data indicating second label data associated with a second training image, on the basis of second feature data output in a case where the second training image is input to the one or plurality of feature extractors 136*a* when new training data including the second training image and the second label data is added. Here, the second training image may be an image to be examined which is captured while a production line is operating, or may be an image which is erroneously determined by the first determiner 136*b*-1. In addition, the second label data is data indicating the state of an examination target, and may be data indicating, for example, the presence or absence of a defect related to an examination target, the type of defect, dimensions of the exterior shape of a defect, the type of examination target, and the like. Training processing of the second determiner 136*b*-2 may be executed after the image determination device 100 is incorporated into a production line and the production line is in operation.

The output part 154 outputs output data indicating an integrated determination result related to an image, on the basis of the second output data output by the second determiner 136*b*-2 on the basis of feature data output in a case where the first output data and an image to be examined, which are output by the first determiner 136*b*-1 on the basis of the feature data output in a case where the image is input to the one or plurality of feature extractors 136*a*, are input to the one or plurality of feature extractors 136*a*. In this manner, the output part 154 integrates the first output data set from the beginning by the first determiner 136*b*-1 and the second output data added afterwards by the second determiner 136*b*-2 and outputs output data indicating an integrated determination result related to an image to be examined.

The output part 154 may change a relative weighting of the first output data and the second output data in accordance with the degree of similarity between the feature data and the second feature data. Here, the feature data is data obtained by inputting a newly captured image to be examined to the one or plurality of feature extractors 136*a*, and the second feature data is data obtained by inputting a second training image included in new training data to the one or plurality of feature extractors 136*a*. In general, the number of second training images may be two or more, and the number of pieces of second feature data may also be two or more. In a case where the degree of similarity between the feature data and the second feature data is calculated, the degree of similarity between data representing the plurality of pieces of second feature data and the feature data may be calculated, or the degree of similarity of each of the plurality of pieces of second feature data and the feature data may be integrated with each other. Thereby, it is possible to determine whether an input image is similar to the second training image according to the degree of similarity between the feature data and the second feature data, and it is possible to change which one of a determination result obtained by the first determiner 136*b*-1 trained using the first training image and a determination result obtained by the second determiner 136*b*-2 trained using the second training image is regarded as important.

The output part 154 may increase a relative weighting of the second output data as a distance between feature data and second feature data in a feature space decreases. In a case where a distance between the feature data and the second feature data is calculated, a distance between feature data and data representing the plurality of pieces of second feature data may be calculated, or a distance between each of the plurality of pieces of second feature data and the feature data may be integrated. Thereby, it is possible to determine whether or not an input image is similar to the second training image according to a distance between the feature data and the second feature data, and it is possible to attach more importance to a determination result obtained by the second determiner 136*b*-2 trained using the second training image as the distance decreases.

§ 3 Operation Example

Figure 4:
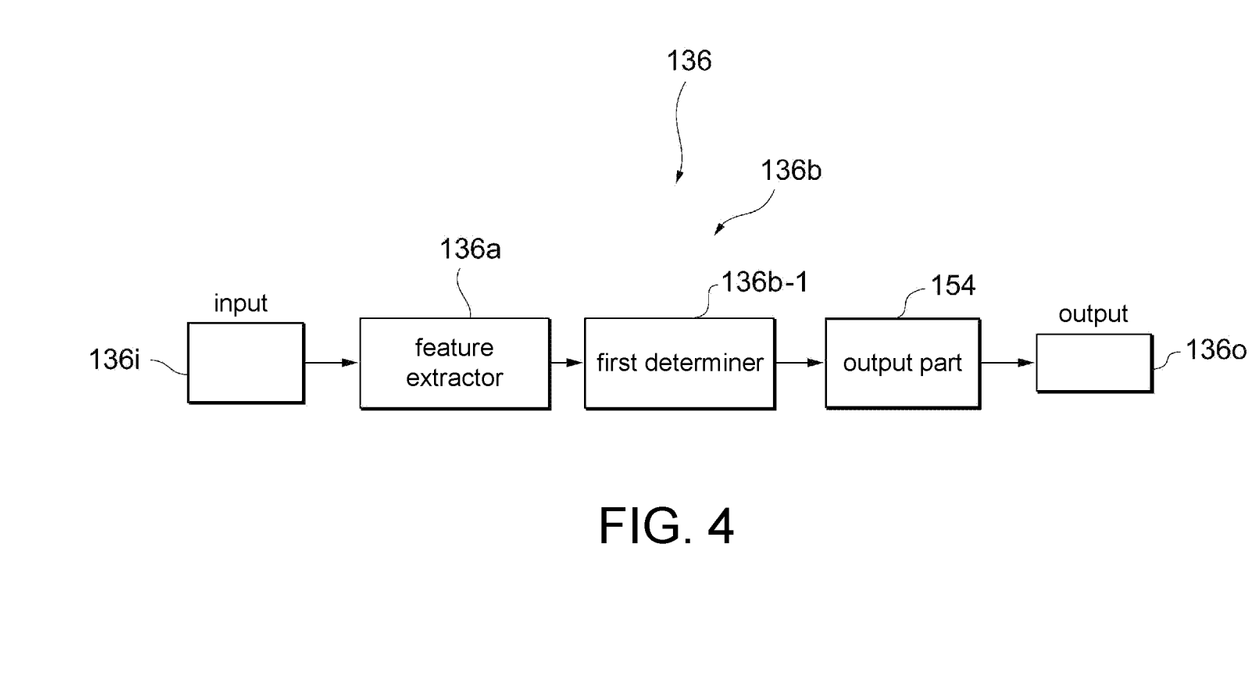
FIG. 4 is a diagram illustrating a configuration example of a training model according to the present embodiment.

FIG. 4 is a diagram illustrating a configuration example of the training model 136 according to the present embodiment. The training model 136 in the present example includes the feature extractor 136*a* and the determiner 136*b*, and the determiner 136*b* includes the first determiner 136*b*-1.

The feature extractor 136*a* receives input data 136*i* (image to be examined) as an input, and outputs feature data indicating the features of the image. The feature extractor 136*a* may extract an edge included in the image, extract a planar region included in the image, extract a background pattern of the image, or extract a binarization region included in the image.

The first determiner 136*b*-1 inputs feature data output from the feature extractor 136*a* and outputs first output data indicating a determination result related to the input data 136*i* (image).

The output part 154 receives the first output data as an input and outputs output data 136*o* indicating an integrated determination result related to the input data 136*i* (image). Meanwhile, in a case where the determiner 136*b* includes only a single determiner as in the present example, the output part 154 may output the first output data received from the first determiner 136*b*-1 as the output data 136*o* as it is.

Figure 5:
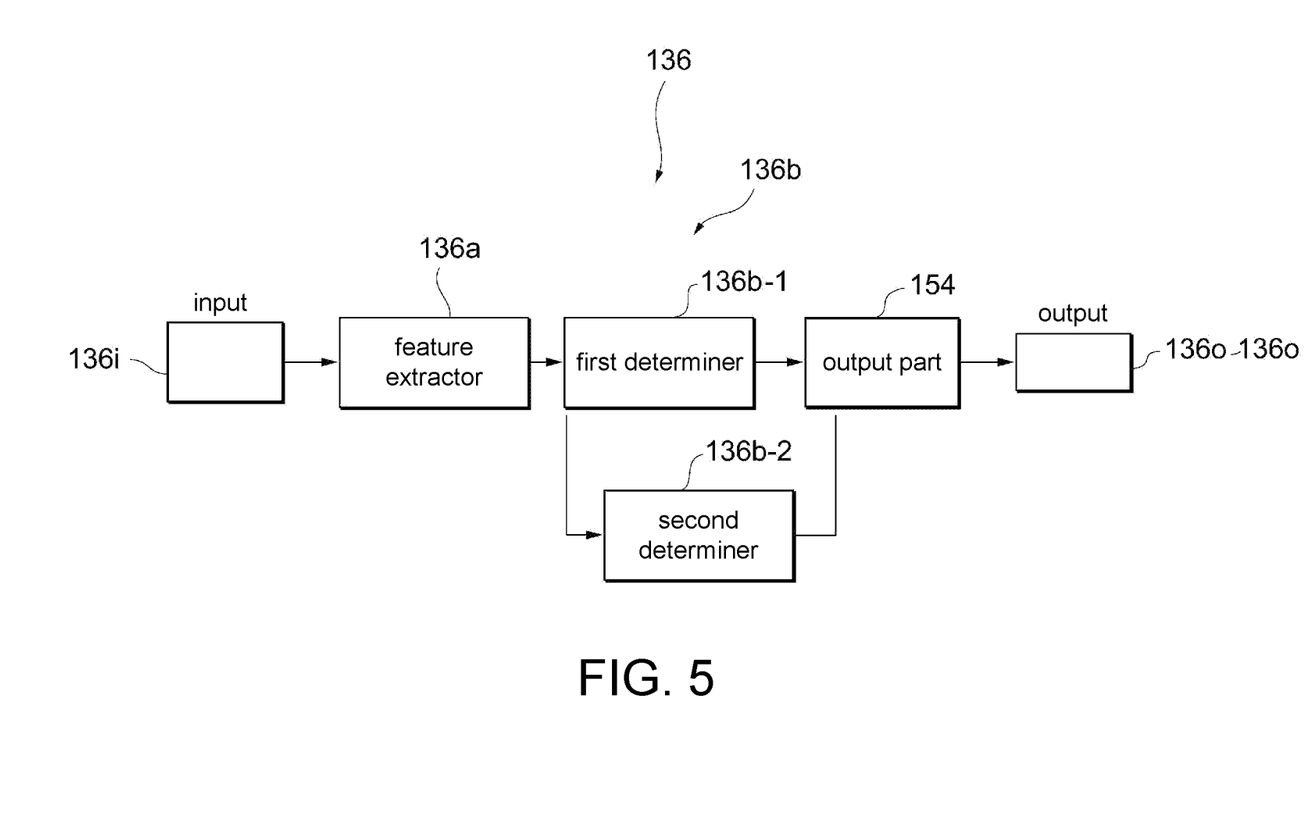
FIG. 5 is a diagram illustrating an editing example of the training model according to the present embodiment.

FIG. 5 is a diagram illustrating an example of editing of the training model 136 according to the present embodiment. In the present example, an example in which the second determiner 136*b*-2 generated using new training data is added is shown. The training model 136 in the present example includes the feature extractor 136*a* and the determiner 136*b*, and the determiner 136*b* includes the first determiner 136*b*-1 and the second determiner 136*b*-2.

The second determiner 136*b*-2 inputs feature data output from the feature extractor 136*a* and outputs second output data indicating a determination result related to the input data 136*i* (image).

The output part 154 receives first output data and second output data as inputs, and outputs the output data 136*o* indicating an integrated determination result related to the input data 136*i* (image). The output part 154 may increase a relative weighting of the second output data as a distance between feature data and second feature data in a feature space decreases. Specifically, when feature data is represented by v, second feature data, which is output in a case where a second training image included in new training data is input to the feature extractor 136*a*, is represented by $v_a$, first output data is represented by y, and second output data is represented by $y_a$, the output part 154 may calculate output data y' as $y'=y+y_a \exp(-\|v_a-v\|^2/2\sigma^2)$. Here, $\|v_a-v\|^2$ represents the square of a distance in the feature space, and may be the square of a distance between data indicating the plurality of pieces of second feature data and the feature data, or may be a total value of squares of distances between each of the plurality of pieces of second feature data and the feature data. Here, $\sigma_a$ is a parameter for reducing the relative weight of the second output data $y_a$ as a distance between the feature data v and the second feature data $v_a$ in the feature space increases. In a case where feature space is multidimensional, the feature data v is a vector. In this case, the second feature data $v_a$ may also be a vector and the parameter $\sigma_a$ may be a matrix so as to correspond to the feature data v. For example, when components of the feature data v is $v=(v_0, v_1, v_2, \ldots)$, the second feature data may be set as $v_a=(v_{a0}, v_{a1}, v_{a2}, \ldots)$, $\sigma_a=\text{diag}(\sigma_{a0}, \sigma_{a1}, \sigma_{a2}, \ldots)$, $y'=y+y_a \exp(-\|v_{a0}-v_0\|^2/2\sigma_{a0}^2)\exp(-\|v_{a1}-v_1\|^2/2\sigma_{a1}^2)\exp(-\|v_{a2}-v_2\|^2/2\sigma_{a2}^2)$.

The output part 154 may output second output data as output data in a case where a distance between feature data and second feature data in a feature space is smaller than a threshold value, and may output first output data as output data in a case where the distance between the feature data and the second feature data is equal to or greater than the threshold value. In addition, the output part 154 may output second output data as output data in a case where a distance between feature data and second feature data in a feature space is smaller than a first threshold value, may output first output data as output data in a case where the distance between the feature data and the second feature data is equal to or greater than a second threshold value larger than the first threshold value, and may output a value, obtained by performing linear interpolation of the first output data and the second output data in accordance with a distance between the pieces of feature data, as output data in a case where the distance between the feature data and the second feature data is equal to or greater than the first threshold value and less than the second threshold value. Specifically, when the distance between the feature data and the second feature data is represented by d, the first threshold value is represented by d1, the second threshold value is represented by d2, the first output data is represented by y, and the second output data is represented by $y_a$, the output part 154 may calculate output data y' as $y'=y_a+(d-d1)\times(y-y_a)/(d2-d1)$ in a case where the distance d between the feature data and the second feature data is equal to or greater than the first threshold value d1 and less than the second threshold value d2.

In a case where the determiner 136*b* includes three or more determiners, the output part 154 may change relative weightings of output data of a previously prepared determiner and a plurality of pieces of output data of a plurality of determiners in accordance with the degree of similarity between feature data of training data used to cause the previously prepared determiner to train and feature data of each of a plurality of pieces of training data used to cause the added plurality of determiners to learn. Specifically, when the feature data of the training data used to cause the previously prepared determiner to train is represented by v, pieces of feature data of the respective plurality of pieces of training data used to cause the added plurality of determiners to train are represented by $v_a, v_b, \ldots$, output data of the previously prepared determiner is represented by y, and the plurality of pieces of output data of the added plurality of determiners are represented by $y_a, y_b, \ldots$, the output part 154 may calculate output data y' as $y'=y+y_a \exp(-\|v_a-v\|^2/2\sigma_a^2)+y_b \exp(-\|v_b-v\|^2/2\sigma_b^2)$. In addition, with respect to each of the plurality of pieces of output data of the added plurality of determiners, the output part 154 may output output data of a determiner added in a case where a distance between feature data of training data used to cause the previously prepared determiner to train and feature data of training data used to cause the added determiner to train is smaller than a threshold value, and may output output data of the previously prepared determiner in a case where the distance is equal to or greater than the threshold value. Further, with respect to each of the plurality of pieces of output data of the added plurality of determiners, when a distance between the feature data of training data used to cause the previously prepared determiner to train and feature data of training data used to cause the added determiner to train is represented by $d_i$, a first threshold value is represented by $d1_i$, a second threshold value is represented by $d2_i$, output data of the previously prepared determiner is represented by y, and output data of the added determiner is represented by the output part 154 may calculate output data y' as $y'=y_i+(d_i-d1_i)\times(y-y_i)/(d2_i-d1_i)$ in a case where the distance $d_i$ is equal to or greater than the first threshold value $d1_i$ and less than the second threshold value $d2_i$.

Further, in a case where the determiner 136*b* includes three or more determiners and classification performed by a first determiner is subdivided by another determiner, the output part 154 may select output data of the other determiner in accordance with first output data of the first determiner, and may calculate output data using the sum of weightings of the first output data and output data of the selected determiner. Specifically, for example, it is assumed that the determiner 136*b* includes a first determiner, a second determiner, and a third determiner, the first determiner outputs binary first output data represented by 0 or 1, the second determiner subdivides an input image when the first output data is 0, and the third determiner subdivides an input image when the first output data is 1. In addition, feature data of training data used for the training of the first determiner is represented by v, feature data of training data used for the training of the second determiner is represented by $v_a$, feature data of training data used for the training of the third determiner is represented by $v_b$, first output data of the first determiner is represented by y, second output data of the second determiner is represented by $y_a$, and third output data of the third determiner is represented by $y_b$. In this case, the output part 154 may calculate output data y' as $y'=y+y_a \exp(-\|v_a-v\|^2/2\sigma_a^2)$ when the first output data y is 0. Here, $\sigma_a$ is a parameter associated with the second determiner. In addition, the output part 154 may calculate output data y' as $y'=y+y_b \exp(-\|v_b-v\|^2/2\sigma_b^2)$ when the first output data y is 1. Here, $\sigma_b$ is a parameter associated with the third determiner. Meanwhile, in a case where the first output data is 0, the output part 154 may output the first output data or the second output data in accordance with $\|v_a-v\|$ or may output a value for interpolating the first output data and the second output data. Similarly, in a case where the first output data is 1, the output part 154 may output the first output data or the third output data in accordance with $\|v_b-v\|$ or may output a value for interpolating the first output data and the third output data.

Figure 6:
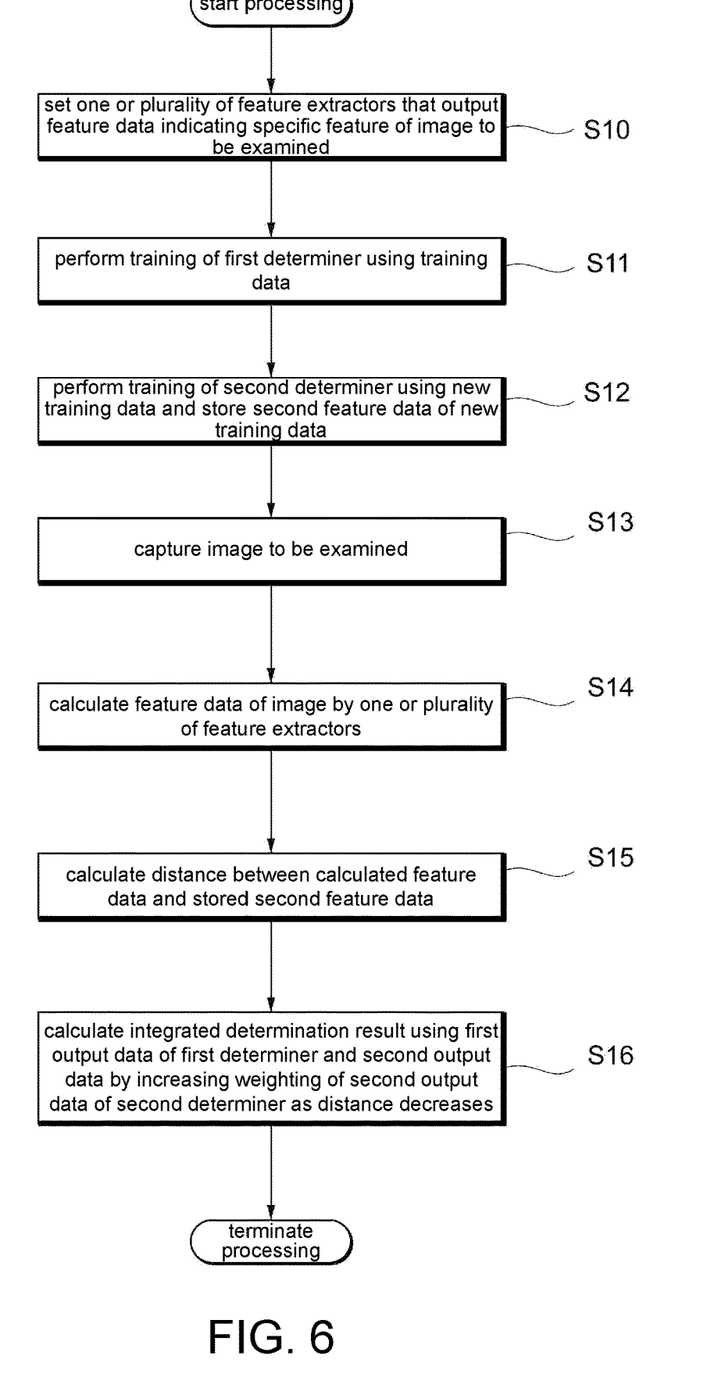
FIG. 6 is a flowchart of image determination processing executed by the image determination device according to the present embodiment.

FIG. 6 is a flowchart of image determination processing executed by the image determination device 100 according to the present embodiment. First, the image determination device 100 sets one or a plurality of feature extractors 136*a* that output feature data indicating a specific feature of an image to be examined (S10).

Thereafter, the image determination device 100 inputs the first training image included in the training data to the one or plurality of feature extractors 136*a* and inputs first feature data, which is output, to the first determiner 136*b*-1 to perform the training of the first determiner 136*b*-1 so that the first output data corresponding to the first label data included in the training data is output (S11).

In addition, the image determination device 100 inputs a second training image included in new training data to the one or plurality of feature extractors 136*a* and inputs second feature data, which is output, to the second determiner 136*b*-2 to perform the training of the second determiner 136*b*-2 so that second output data corresponding to second label data included in the new training data is output, and stores the second feature data (S12).

In a case where the second determiner 136*b*-2 is trained, the image determination device 100 may fix parameters of the feature extractor 136*a* and the first determiner 136*b*-1 using only the second training image included in the new training data and then adjust the parameters of the second determiner 136*b*-2 so that the second label data included in the new training data can be estimated from an integrated determination result obtained by combining the first output data of the first determiner 136*b*-1 and the second output data of the second determiner 136*b*-2 with each other. Here, in a case where the number of second training images is one, feature data which is output as a result of inputting the second training image to the feature extractor 136*a* is set to be second feature data $v_a$ corresponding to the second determiner 136*b*-2, and the parameter $\sigma_a$ may be determined by a user so that the influence on the original training data is reduced through additional training. Further, in a case where the number of second training images is two or more, results, obtained by performing statistical processing on a plurality of pieces of feature data that are output as a result of inputting the plurality of second training images to the feature extractor 136*a*, may be set to be second feature data $v_a$ and a parameter $\sigma_a$ corresponding to the second determiner 136*b*-2. For example, an average value of average values of components of feature data which is output as a result of inputting the plurality of second training images to the feature extractor 136*a* and which is represented as a vector may be set to be $v_a$, and a standard deviation of components of feature data represented as a vector may be set to be $\sigma_a$.

Thereafter, an image to be examined is captured by the camera 102 (S13). Then, the image determination device 100 inputs a newly captured image to the one or plurality of feature extractors 136*a* and calculates feature data of the image (S14). The image determination device 100 calculates a distance between the calculated feature data and stored second feature data (S15).

The image determination device 100 calculates an integrated determination result using first output data of the first determiner 136*b*-1 and second output data of the second determiner 136*b*-2 by increasing a weighting of the second output data of the second determiner 136*b*-2 as the calculated distance decreases (S16). Naturally, processing from the capturing of an image (S13) to the calculation of output data (S16) may be repeatedly performed. Thus, the image determination processing is terminated.

§ 4 Modification Example

Figure 7:
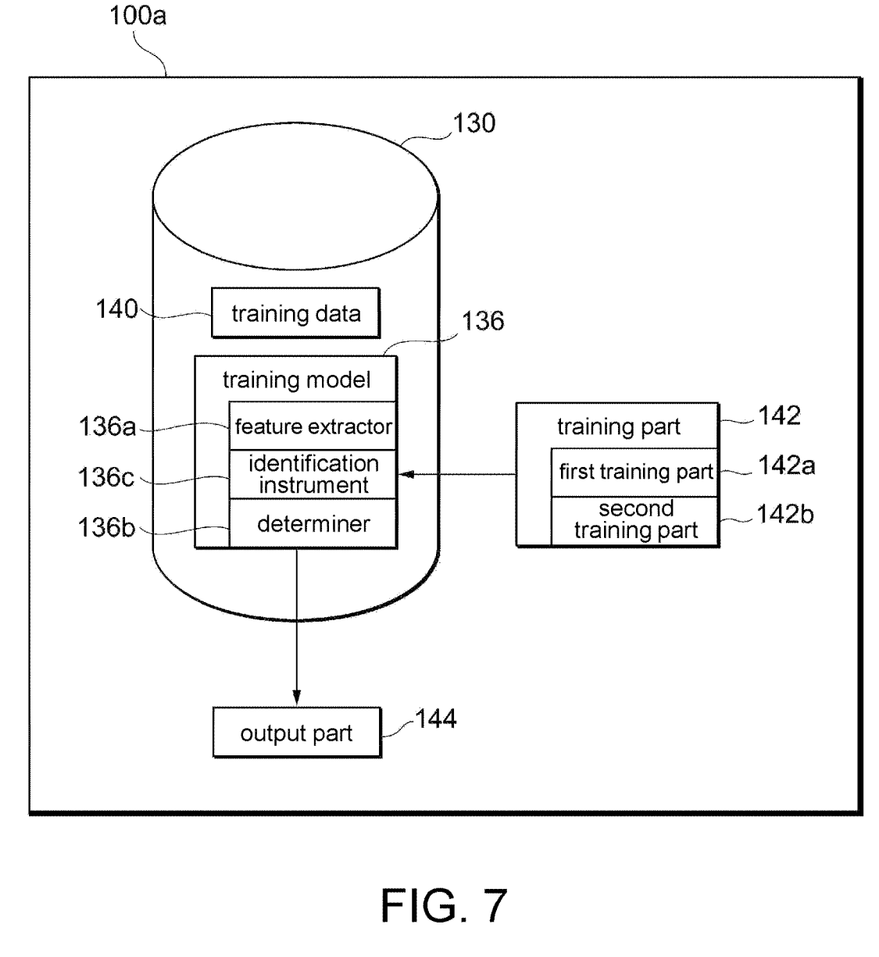
FIG. 7 is a diagram illustrating functional blocks of an image determination device according to a modification example of the present embodiment.

FIG. 7 is a diagram illustrating functional blocks of an image determination device 100*a* according to a modification example of the present embodiment. The image determination device 100*a* according to the modification example is different from the image determination device 100 according to the present embodiment in that an identification device 136*c* is included in the training model 136, and has the same configuration as the image determination device 100 according to the present embodiment with regard to the other configurations. Hereinafter, differences will be described.

The identification device 136*c* identifies to which one of first feature data and second feature data feature data is similar. For example, the identification device 136*c* may calculate a distance between feature data and first feature data in a feature space and a distance between feature data and second feature data, and may identify data having a close distance as data similar to the feature data. Here, in a case where a distance between the feature data and the first feature data is calculated, a distance between data representing a plurality of pieces of first feature data and the feature data may be calculated, and a distance between each of the plurality of pieces of first feature data and the feature data may be integrated. This is the same as for a plurality of pieces of second feature data.

The output part 154 changes relative weightings of first output data of the first determiner 136*b*-1 and second output data of the second determiner 136*b*-2 on the basis of an identification result obtained by the identification device 136*c*. Specifically, the output part 154 outputs output data indicating an integrated determination result by increasing a weighting of data identified as being similar to feature data by the identification device 136*c* out of the first feature data and the second feature data.

In this manner, it is possible to determine to which one of a first training image and a second training image an input image is similar by identifying to which one of the first feature data and the second feature data to feature data is similar by an identification device, and it is possible to change which one of a determination result obtained by the first determiner 136*b*-1 trained using the first training image and a determination result obtained by the second determiner 136*b*-2 trained using the second training image is regarded as important.

Figure 8:
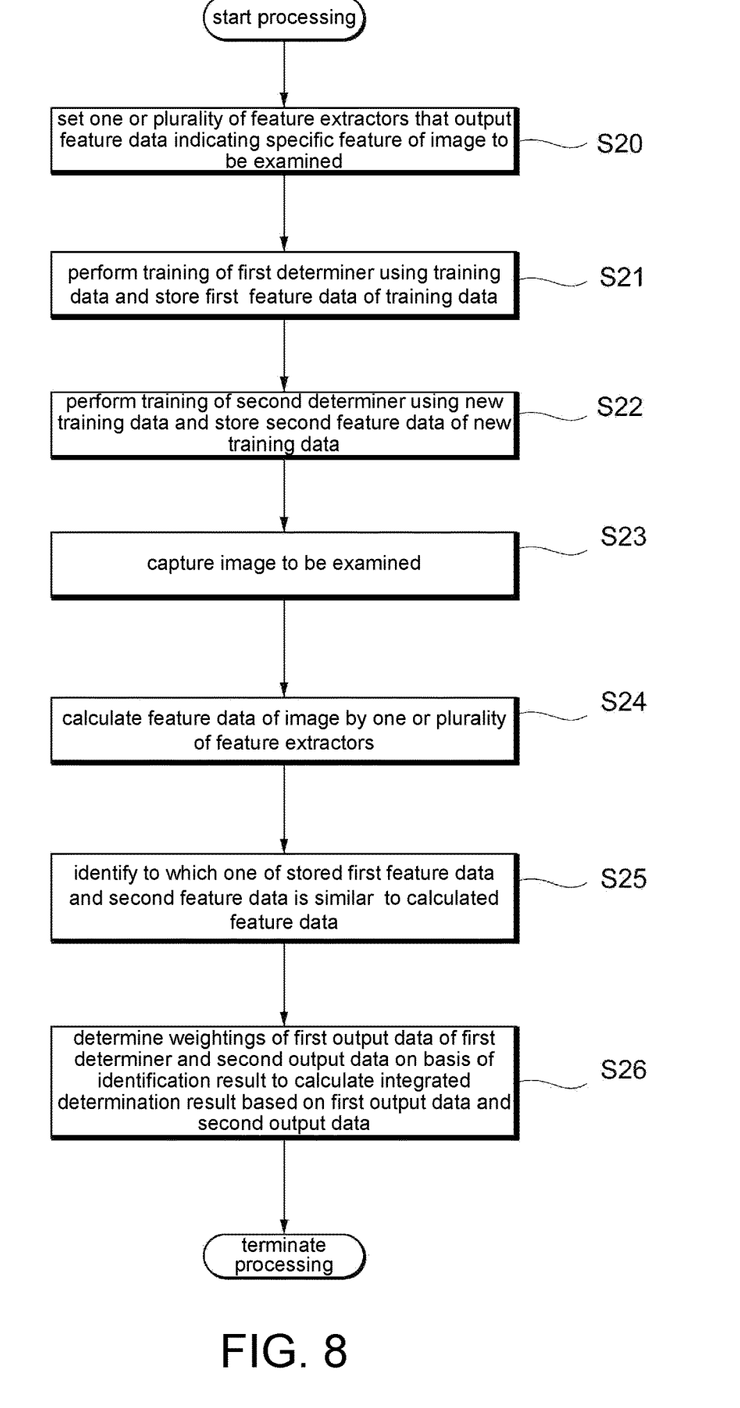
FIG. 8 is a flowchart of image determination processing executed by the image determination device according to the modification example of the present embodiment.

FIG. 8 is a flowchart of image determination processing executed by the image determination device 100*a* according to the modification example of the present embodiment. First, the image determination device 100*a* sets one or a plurality of feature extractors 136a that output feature data indicating a specific feature of an image to be examined (S20).

Thereafter, image determination device 100a inputs a first training image included in training data to the one or plurality of feature extractors 136a and inputs first feature data, which is output, to the first determiner 136b-1 to perform the training of the first determiner 136b-1 so that first output data corresponding to first label data included in the training data is output, and stores the first feature data (S21).

In addition, the image determination device 100a inputs a second training image included in new training data to the one or plurality of feature extractors 136a and inputs second feature data, which is output, to the second determiner 136b-2 to perform the training of the second determiner 136b-2 so that second output data corresponding to second label data included in the new training data is output, and stores the second feature data (S22).

Thereafter, an image to be examined is captured by the camera 102 (S23). Then, the image determination device 100a inputs a newly captured image to the one or plurality of feature extractors 136a to calculate feature data of the image (S24). The image determination device 100a identifies to which one of the stored first feature data and second feature data the calculated feature data is similar (S25).

The image determination device 100a determines weightings of the first output data of the first determiner 136b-1 and the second output data of the second determiner 136b-2 on the basis of an identification result to calculate an integrated determination result based on the first output data and the second output data (S26). Naturally, processing from the capturing of an image (S23) to the calculation of output data (S26) may be repeatedly performed. Thus, the image determination processing is terminated.

The above-described embodiment is intended to facilitate the understanding of the present invention and is not intended to limitedly analyze the present invention. The components included in the embodiment and the dispositions, materials, conditions, shapes, sizes, and the like thereof are not limited to those exemplified and can be changed appropriately. In addition, configurations shown in different embodiments can be partially replaced or combined.

Meanwhile, a portion or the entirety of the above-described embodiment can be described as in the following additions, but is not limited to the following description.

[Addition 1]

An image determination device including:
one or a plurality of feature extractors (136a) each of which outputs feature data indicating a specific feature of an image to be examined on the basis of the image;
a first determiner which outputs first output data indicating a determination result related to the image on the basis of the feature data output from the one or plurality of feature extractors (136a);
a second determiner (136b-2) which outputs second output data indicating a determination result related to the image on the basis of the feature data output from the one or plurality of feature extractors (136a);
a first training part which causes the first determiner to train so as to output the first output data indicating first label data associated with a first training image, on the basis of first feature data which is output in a case where the first training image is input to the one or plurality of feature extractors (136a) using training data including the first training image and the first label data;
a second training part which causes the second determiner (136b-2) to train so as to output second output data indicating second label data associated with a second training image, on the basis of second feature data which is output in a case where the second training image is input to the one or plurality of feature extractors (136a) in a case where new training data including the second training image and the second label data is added; and
an output part (154) which outputs output data indicating an integrated determination result related to the image, on the basis of the first output data which is output by the first determiner on the basis of the feature data, which is output in a case where the image is input to the one or plurality of feature extractors (136a), and the second output data which is output by the second determiner (136b-2) on the basis of the feature data, which is output in a case where the image is input to the one or plurality of feature extractors (136a).

[Addition 2]

The image determination device (100) according to Addition 1, wherein the output part (154) changes relative weightings of the first output data and the second output data in accordance with a degree of similarity between the feature data and the second feature data.

[Addition 3]

The image determination device (100) according to Addition 2, wherein the output part (154) increases the relative weighting of the second output data as a distance between the feature data and the second feature data in a feature space decreases.

[Addition 4]

The image determination device (100) according to Addition 2 or 3, further including:
An identification device (136c) which identifies to which one of the first feature data and the second feature data the feature data is similar,
wherein the output part (154) changes relative weightings of the first output data and the second output data on the basis of an identification result obtained by the identification device.

[Addition 5]

An image determination method including:
causing a first determiner to train so as to output first output data indicating first label data associated with a first training image, on the basis of first feature data which is output in a case where the first training image is input to one or a plurality of feature extractors (136a) using training data including the first training image and the first label data, the first determiner outputting the first output data indicating a determination result related to an image to be examined on the basis of feature data which is output from the one or plurality of feature extractors (136a) that output the feature data indicating a specific feature of the image on the basis of the image;
causing a second determiner (136b-2) to train so as to output second output data indicating second label data associated with a second training image, on the basis of second feature data which is output in a case where the second training image is input to the one or plurality of feature extractors (136a), the second determiner (136b-2) outputting the second output data indicating a determination result related to the image on the basis of the feature data output from the one or plurality of feature extractors (136a) in a case where new training data including the second training image and the second label data is added; and outputting output data indicating an integrated determination result related to the image, on the basis of the first output data which is output by the first determiner on the basis of the feature data, which is output in a case where the image is input to the one or plurality of feature extractors (136a), and the second output data which is output by the second determiner (136b-2) on the basis of the feature data, which is output in a case where the image is input to the one or plurality of feature extractors (136a).

[Addition 6]

An image determination program causing a computation part included in an image determination device (100) to function as:

one or a plurality of feature extractors (136a) each of which outputs feature data indicating a specific feature of an image to be examined on the basis of the image;

a first determiner which outputs first output data indicating a determination result related to the image on the basis of the feature data output from the one or plurality of feature extractors (136a);

a second determiner (136b-2) which outputs second output data indicating a determination result related to the image on the basis of the feature data output from the one or plurality of feature extractors (136a);

a first training part which causes the first determiner to train so as to output the first output data indicating first label data associated with a first training image, on the basis of first feature data which is output in a case where the first training image is input to the one or plurality of feature extractors (136a) using training data including the first training image and the first label data;

a second training part which causes the second determiner (136b-2) to train so as to output second output data indicating second label data associated with a second training image, on the basis of second feature data which is output in a case where the second training image is input to the one or plurality of feature extractors (136a) in a case where new training data including the second training image and the second label data is added; and an output part (154) which outputs output data indicating an integrated determination result related to the image, on the basis of the first output data which is output by the first determiner on the basis of the feature data, which is output in a case where the image is input to the one or plurality of feature extractors (136a), and the second output data which is output by the second determiner (136b-2) on the basis of the feature data, which is output in a case where the image is input to the one or plurality of feature extractors (136a).

What is claimed is:

1. An image determination device comprising:
a memory, configured to store a training model, wherein the training model comprises:
one or a plurality of feature extractors each of which outputs feature data indicating a specific feature of an image to be examined on the basis of the image;
a first determiner which outputs first output data indicating a determination result related to the image on the basis of the feature data output from the one or plurality of feature extractors; and
a second determiner which outputs second output data indicating a determination result related to the image on the basis of the feature data output from the one or plurality of feature extractors;
a processor, configured to:
cause the first determiner to train so as to output the first output data indicating first label data associated with a first training image, on the basis of first feature data which is output in a case where the first training image is input to the one or plurality of feature extractors using training data including the first training image and the first label data;
cause the second determiner to train so as to output second output data indicating second label data associated with a second training image, on the basis of second feature data which is output in a case where the second training image is input to the one or plurality of feature extractors in a case where new training data including the second training image and the second label data is added; and
output output data indicating an integrated determination result related to the image, on the basis of the first output data and the second output data, wherein the first output data is output by the first determiner on the basis of the feature data output in a case where the image is input to the one or plurality of feature extractors, and the second output data is output by the second determiner on the basis of the feature data output in a case where the image is input to the one or plurality of feature extractors, wherein the processor changes relative weightings of the first output data and the second output data in accordance with a degree of similarity between the feature data and the second feature data.

2. The image determination device according to claim 1, wherein the processor increases the relative weighting of the second output data as a distance between the feature data and the second feature data in a feature space decreases.

3. The image determination device according to claim 2, wherein the training model further comprises an identifier which identifies whether the feature data is similar to the first feature data or the second feature data, and
wherein the processor changes relative weightings of the first output data and the second output data on the basis of an identification result obtained by the identification device.

4. The image determination device according to claim 1, wherein the training model further comprises an identifier which identifies whether the feature data is similar to the first feature data or the second feature data, and
wherein the processor changes relative weightings of the first output data and the second output data on the basis of an identification result obtained by the identification device.

5. An image determination method comprising:
causing a first determiner to train so as to output first output data indicating first label data associated with a first training image, on the basis of first feature data which is output in a case where the first training image is input to one or a plurality of feature extractors using training data including the first training image and the first label data, the first determiner outputting the first output data indicating a determination result related to an image to be examined on the basis of feature data which is output from the one or plurality of feature extractors that output the feature data indicating a specific feature of the image on the basis of the image;

causing a second determiner to train so as to output second output data indicating second label data associated with a second training image, on the basis of second feature data which is output in a case where the second training image is input to the one or plurality of feature extractors, the second determiner outputting the second output data indicating a determination result related to the image on the basis of the feature data output from the one or plurality of feature extractors in a case where new training data including the second training image and the second label data is added; and outputting output data indicating an integrated determination result related to the image, on the basis of the first output data and the second output data, wherein the first output data is output by the first determiner on the basis of the feature data output in a case where the image is input to the one or plurality of feature extractors, and the second output data is output by the second determiner on the basis of the feature data output in a case where the image is input to the one or plurality of feature extractors, wherein relative weightings of the first output data and the second output data are changed in accordance with a degree of similarity between the feature data and the second feature data.

6. A non-transitory computer readable medium storing an image determination program causing a processor included in an image determination device to:

storing a training model in a memory, wherein the training model comprises:

one or a plurality of feature extractors each of which outputs feature data indicating a specific feature of an image to be examined on the basis of the image;

a first determiner which outputs first output data indicating a determination result related to the image on the basis of the feature data output from the one or plurality of feature extractors;

a second determiner which outputs second output data indicating a determination result related to the image on the basis of the feature data output from the one or plurality of feature extractors;

causing the first determiner to train so as to output the first output data indicating first label data associated with a first training image, on the basis of first feature data which is output in a case where the first training image is input to the one or plurality of feature extractors using training data including the first training image and the first label data;

causing the second determiner to train so as to output second output data indicating second label data associated with a second training image, on the basis of second feature data which is output in a case where the second training image is input to the one or plurality of feature extractors in a case where new training data including the second training image and the second label data is added; and outputting output data indicating an integrated determination result related to the image, on the basis of the first output data and the second output data, wherein the first output data is output by the first determiner on the basis of the feature data output in a case where the image is input to the one or plurality of feature extractors, and the second output data is output by the second determiner on the basis of the feature data output in a case where the image is input to the one or plurality of feature extractors, wherein relative weightings of the first output data and the second output data are changed in accordance with a degree of similarity between the feature data and the second feature data.

\* \* \* \* \*